United States Patent [19]

Behr

[11] Patent Number: 5,580,143
[45] Date of Patent: Dec. 3, 1996

[54] REAL IMAGE DIRECT FRONT PROJECTOR

[75] Inventor: Karl-Günter Behr, Biebertal, Germany

[73] Assignee: ProCent Patent-und Verwaltungs AG, Zurich, Germany

[21] Appl. No.: 499,714

[22] Filed: Jul. 7, 1995

[30] Foreign Application Priority Data

Jul. 9, 1994 [DE] Germany .............................. 9411145 U

[51] Int. Cl.[6] ..................................................... G03B 21/00
[52] U.S. Cl. ............................ 353/38; 353/65; 353/DIG. 4
[58] Field of Search .................................. 353/38, 65, 66, 353/DIG. 4, DIG. 3

[56] References Cited

U.S. PATENT DOCUMENTS

| | | | |
|---|---|---|---|
| 3,951,535 | 4/1976 | Altman | 353/65 |
| 4,943,156 | 7/1990 | Vanderwerf | 353/38 |
| 4,979,813 | 12/1990 | Koga et al. | 353/DIG. 4 |
| 4,986,651 | 1/1991 | Vanderwerf | 353/38 |

FOREIGN PATENT DOCUMENTS

| | | | |
|---|---|---|---|
| 4247441 | 9/1992 | Japan | 353/30 |
| 4016358 | 7/1994 | WIPO | 353/30 |

*Primary Examiner*—William Dowling
*Attorney, Agent, or Firm*—Friedrich Kueffner

[57] ABSTRACT

A real image direct front projector includes a housing with a plane transparent object support for placing objects thereunder and for permitting light emitted from at least one light source to pass therethrough. A projection lens is mounted concentrically above the object support for producing an object image on an image wall outside of the projector. The projection lens is located above and vertically within the circumference of the object support. The object support has in at least a predetermined area thereof a plurality of microprisms on a side of the object support facing away from the object.

8 Claims, 3 Drawing Sheets

REAL IMAGE DIRECT FRONT PROJECTOR

BACKGROUND OF THE INVENTION

1. Field of the Invention

The invention relates to a real image direct front projector including a housing with a plane transparent object support on which the object is placed and which permits light emanating from at least one light source to pass through, with a projection lens for converging the reflection rays emanating from the object for producing an object image on an image wall outside of the projector, and possibly with an auxiliary mirror.

2. Description of the Related Art

Direct front projectors of this type, also called episcopes, serve for producing a real image of an object, for example, a document, a photograph or the like, with the use of light rays which emanate from a light source, are conducted over a reflector mirror, are reflected irregularly by the object and are cast onto an image wall and a projection lens.

In the real image projectors which are usually used, in which an object is placed on an object support composed of glass or a similar material and is subjected to direct light rays from at least one light source, auxiliary mirrors for reflecting the light reflected by the object and the projection lens are arranged in a housing. In that case, the light source must be arranged in such a position that it is ensured that, in order to avoid an impairment of the dissolution of image formed as a result of the regularly reflected light, the light rays emanating from the light source and reflected by the object support in accordance with the object and regularly reflected by the object support in accordance with the reflection laws are not cast over the auxiliary mirror to the projection lens. Moreover, the light source must be arranged outside of the angular coverage of the projection lens and the light source must be arranged far away from the object table in order to uniformly illuminate the object table.

In order to avoid these disadvantages, real image direct front projectors are known in which auxiliary mirrors are mounted parallel to the optical axis and laterally next to the projection lens. These auxiliary mirrors have the purpose of permitting the light emanating from the light source arranged next to the projection lens to be cast obliquely onto the object support, in order to prevent these rays from reaching the projection lens by being reflected at the object support as a result of the law of reflection and from being cast as disturbing bright spots onto the image wall and impairing the image quality. In such an embodiment of a real image direct front projector, the object support is illuminated very irregularly because the laterally mounted light source—several light sources are also possible—is arranged asymmetrically relative to the object support. In addition, the light radiating obliquely onto the object support results in a significantly reduced and defused light reflection from the object to the projection lens than would be the case if the light rays are directed almost perpendicularly onto the object and are deflected with a greater reflection light to the projection lens.

Therefore, the invention is based on the object of providing a real image direct front projector which has a small dimensions and ensures a uniform, optimum illumination of the object and prevents harmful reflected light.

For meeting this object, the invention proposes in a real image direct front projector of the above-described type to provide the object support on its side facing away from the object and over a predetermined area with a plurality of microprisms.

As a result of this configuration, the light source, or a plurality of light sources, can be arranged in the vicinity of the projection lens, so that a substantially uniform optimum illumination of the object support and, thus, of the object is ensured. The reflected stray light rays are deflected next to the entry area of the projection lens, so that harmful reflected light on the image wall is prevented. This is also achieved when an auxiliary mirror is arranged between the object support and the projection lens.

Additional features of a real image direct front projector according to the invention are disclosed in claims 2 to 8.

BRIEF DESCRIPTION OF THE DRAWING

In the following, the invention will be explained in more detail with the aid of an embodiment which is schematically illustrated in the drawing. In the drawing.

DESCRIPTION OF THE PREFERRED EMBODIMENTS

Figure 1:
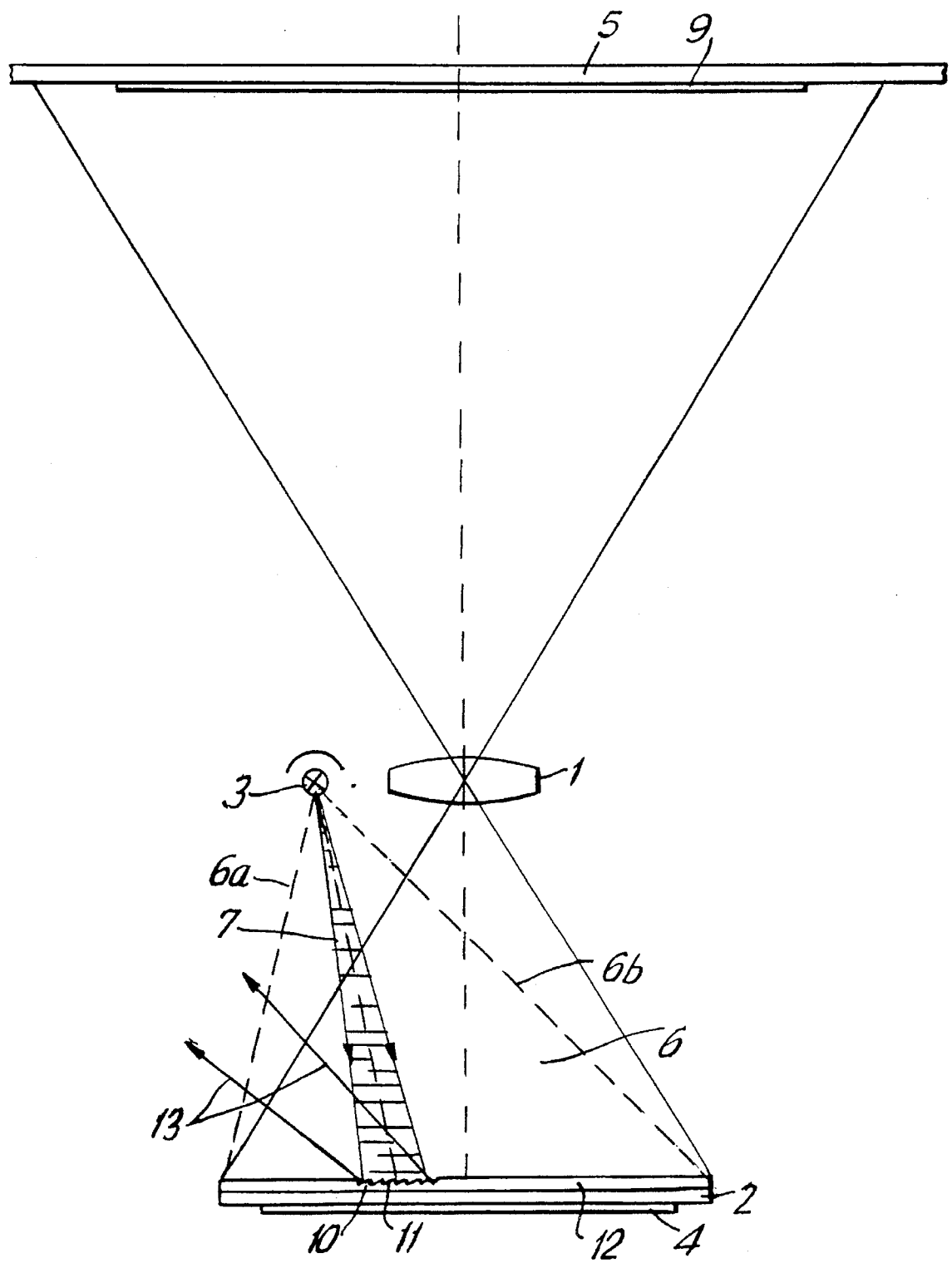
FIG. 1 shows the essential parts of a real image direct front projector according to the invention.
Figure 4:
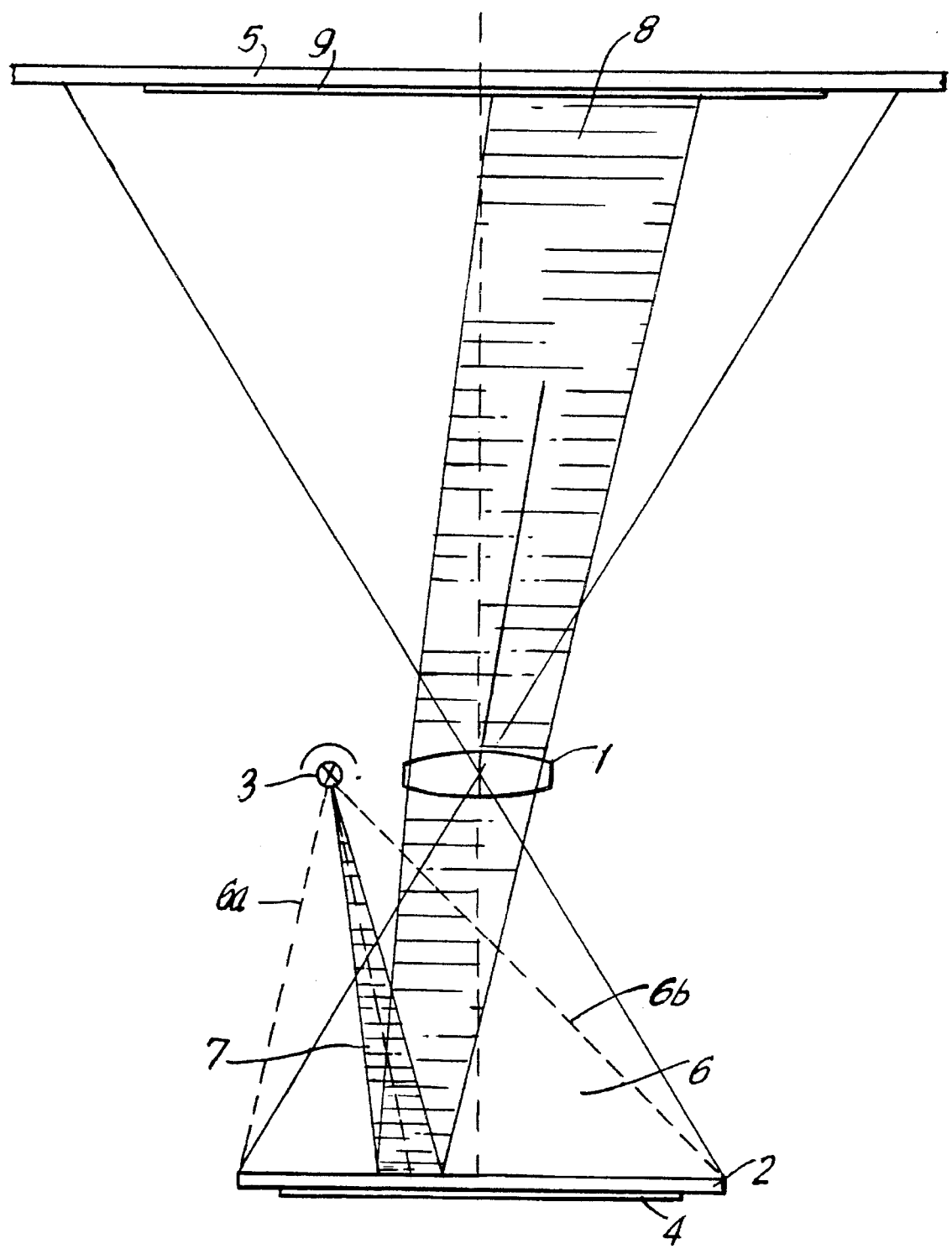
FIG. 4 is a view corresponding to FIG. 1 showing the prior art.

FIGS. 1 and 4 of the drawing show of a real image direct front projector only the projection lens 1, the object support 2 and the light source 3 which are arranged in a housing, not shown, possibly together with an auxiliary mirror. The real image direct front projector serves for the projection of an object 4, also called projection copy, onto a projection wall 5. For this purpose, the object 4 is placed against the side of the object support 2 which is at the bottom as shown in the drawing. The object support 2 is of glass or a similar material. The light source 3, or several light sources 3, is arranged next to the projection lens 1 in such a way that the illumination rays characterized by a ray bundle 6 with the border rays 6a, 6b for producing an illumination as uniform as possible extend approximately symmetrically relative to the object support 2, so that only small length differences exist between the border rays 6a, 6b.

In the embodiment according to the prior art shown in FIG. 4, a ray bundle 7 within the ray bundle 6 is emitted by the light source 3, wherein the ray bundle 7 is deflected through the upper and lower surfaces of the object support 2 over the entire cross-section of the projection lens 1 in the form of a light spot 8 which is a harmful influence on the projection image 9 of the object 4. This disadvantageous effect is also present when an auxiliary mirror, not shown in the drawing, is provided between the object 4 and the projection lens 1.

In order to avoid this harmful influence, in accordance with the embodiment of the invention shown in FIG. 1 of the drawing, an area 10 in which several microprisms 11 are arranged is provided on the object support 2. In this embodiment, the microprisms 11 are formed by a prism disk 12 which is constructed as a Fresnel lens and is arranged on the object support 2. The side angle or inclination angle "γ" (FIG. 2) is selected in such a way that over the entire surface of the object support 2 no reflecting light rays reach the projection lens 1 as a result of reflected light at the sides of the microprisms 11 and the plane object support 2.

Figure 2:
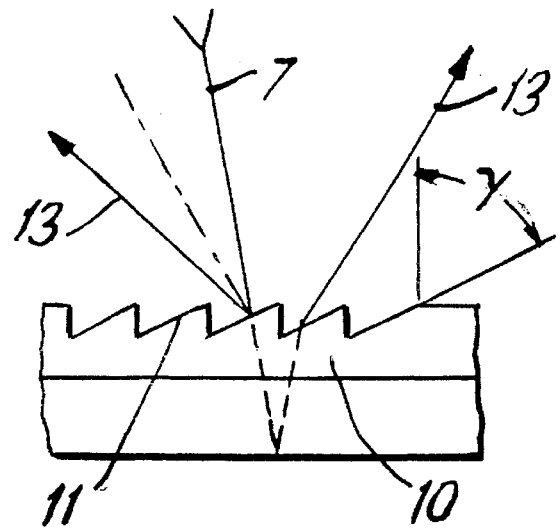
FIG. 2 is an enlarged illustration of the object support of FIG. 1.

As is very clearly visible in FIG. 1 of the drawing, the ray bundle 7 emanating from the light source 3 is deflected at the surface of the object support 2 in such a way that the reflection rays 13, including those from the bottom side of the object support 2 as seen in FIG. 2, are deflected in a range outside of the projection lens 1. As a result, these light rays can no longer reach the projection wall 5 as a harmful light spot. However, by the effect of the Fresnel lens, an improvement of the quality of the projection image 9 on the projection wall 5 is achieved.

Figure 3:
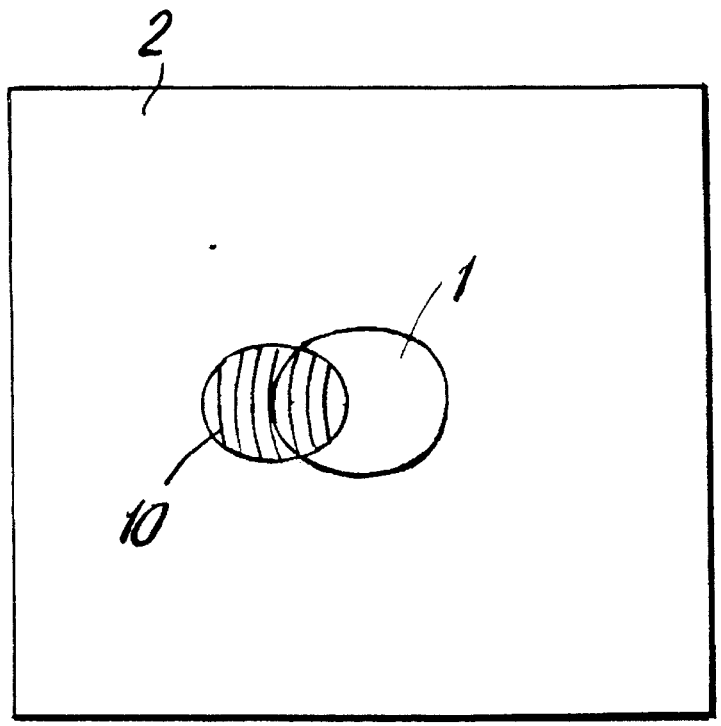
FIG. 3 is a top view of the object support of FIG. 1 shown with objective.

Depending on the number of light sources 3 used, a corresponding number of areas 10 with microprisms 11 may be provided on the object support 2, wherein the areas 10 have such a size (see FIG. 3) that the reflection rays 13 no longer reach the projection lens 1. This means that the size of the area 10 is determined by the size and location of the light source 3 and of the projection lens 1. Therefore, it is advantageous if the area 10 with the microprisms 11 extends over the entire surface of the object support 2, so that no harmful reflected rays can reach the projection lens 1 from any location of the object support 2.

A practical embodiment of this prism arrangement is achieved if a thin plastic plate of transparent material is laminated onto that side of the object support 2 which faces away from the object 4. This thin plastic plate has the required microprisms 11 at least in the area 10 or areas 10 described above. It is basically also possible to arrange the prism disk 12 at a distance from the object support 2. However, this results in the disadvantage that the light rays must penetrate through two additional glass and air transitions for illuminating the object 4, which results in a darker protection image 9. If necessary, it is also possible to construct the microprisms 11, or the areas 10 with the microprisms 11, integrally with the object support 2.

I claim:

1. A real image direct front projector, comprising a housing with a plane transparent object support for placing objects thereunder and for permitting light emitted from at least one light source to pass therethrough, the object support having a center and a circumference, a projection lens for converging the reflection rays reflected from an object for producing an object image on an image wall outside of the projector, the projection lens being mounted vertically above the center of the object support, the light source being mounted above and vertically within the circumference of the object support, the object support comprising at least in a predetermined area thereof a plurality of microprisms on a side of the object support facing away from the object.

2. The projector according to claim 1, further comprising an auxiliary mirror between the projection lens and the object support.

3. The projector according to claim 1, wherein each microprism has a side angle which does not permit any reflecting light rays due to reflected light at the prism sides and the plane object support to reach the projection lens.

4. The projector according to claim 1, wherein the predetermined area with the plurality of microprisms is formed only where undesired reflection rays are to be avoided.

5. The projector according to claim 1, wherein the microsprisms are formed integrally with the object support.

6. The projector according to claim 1, wherein the microprisms are arranged as an additional element above the object support.

7. The projector according to claim 6, wherein the microprisms are fixedly connected to the object support.

8. The projector according to claim 1, wherein the predetermined area of the object support with the plurality of microprisms is formed by at least one prism disk.

* * * * *